United States Patent [19]

Chang

[11] Patent Number: 5,056,000
[45] Date of Patent: Oct. 8, 1991

[54] SYNCHRONIZED PARALLEL PROCESSING WITH SHARED MEMORY

[75] Inventor: Robin Chang, Mattapoisett, Mass.

[73] Assignee: International Parallel Machines, Inc., New Bedford, Mass.

[21] Appl. No.: 436,098

[22] Filed: Nov. 7, 1989

Related U.S. Application Data

[63] Continuation of Ser. No. 209,515, Jun. 21, 1988, abandoned.

[51] Int. Cl.[5] ............................................. G06F 15/16
[52] U.S. Cl. ................................. 364/200; 364/228.1; 364/228.8; 364/230.4; 364/243.1; 364/254.4
[58] Field of Search .................................... 364/200, 900

[56] References Cited

U.S. PATENT DOCUMENTS

| | | | |
|---|---|---|---|
| 3,226,688 | 12/1965 | Amdahl et al. | 364/200 |
| 3,651,473 | 3/1972 | Faber | 364/200 |
| 3,787,818 | 1/1974 | Arnold et al. | 364/200 |
| 4,051,551 | 9/1977 | Lawrie et al. | 364/200 |
| 4,253,146 | 2/1981 | Bellamy et al. | 364/200 |
| 4,365,292 | 12/1982 | Barnes et al. | 364/200 |
| 4,400,768 | 8/1983 | Tomlinson | 364/200 |
| 4,412,286 | 10/1983 | O'Dowd et al. | 364/200 |
| 4,412,303 | 10/1983 | Barnes et al. | 364/900 |
| 4,413,315 | 11/1983 | Kurakake | 364/200 |
| 4,435,758 | 3/1984 | Lorie et al. | 364/200 |
| 4,484,262 | 11/1984 | Sullivan et al. | 364/200 |
| 4,514,807 | 4/1985 | Nogi | 364/200 |
| 4,591,977 | 5/1986 | Nissen et al. | 364/200 |
| 4,707,781 | 11/1987 | Sullivan et al. | 364/200 |
| 4,731,724 | 3/1988 | Michel et al. | 364/200 |
| 4,855,903 | 8/1989 | Carleton et al. | 364/200 |

OTHER PUBLICATIONS

Baru et al., "The Architecture of SM3: A Dynamically Partitionable Multicomputer System", IEEE Transactions on Computers, vol. C-35, No. 9, Sep. 1986, pp. 790–802.

"Computer Design", System Testing, A PennWell Publication, Sep. 15, 1985, a Reprint, International Parallel Machines, Inc.

"Introducing IP-1, The First True Parallel Processing Minicomputer in Production", Catalogue by International Parallel Machines, Inc.

Primary Examiner—Gareth D. Shaw
Assistant Examiner—Matthew C. Fagan
Attorney, Agent, or Firm—Weingarten, Schurgin, Gagnebin & Hayes

[57] ABSTRACT

A high speed computer that permits the partitioning of a single computer program into smaller concurrent processes running in different parallel processors. The program execution time is divided into synchronous phases, each of which may require a shared memory to be configured in a distinct way. At the end of each execution phase, the processors are resynchronized such that the composite system will be in a known state at a known point in time. The computer makes efficient use of hardware such that n processors can solve a problem almost n times as fast as a single processor.

8 Claims, 7 Drawing Sheets

SYNCHRONIZED PARALLEL PROCESSING WITH SHARED MEMORY

This application is a continuation of application Ser. No. 07/209,515, filed June 21, 1988, now abandoned.

FIELD OF THE INVENTION

This invention relates in general to high speed computer systems, and more particularly, to a parallel processing computer system using synchronous phases.

BACKGROUND OF THE INVENTION

Parallel processing is the ability to partition a single large computer program into smaller pieces that can be executed simultaneously in different processors to achieve higher throughput. There are two general classes of parallel-processing computers: (1) the Single-Instruction/Multi-Data Stream (SIMD) computer which can apply a single instruction to multiple data elements simultaneously, such as found in array processors, vector processors and systolic computers, and (2) Multi-Instruction/Multi-Data Stream (MIMD) computers, which can apply multiple instructions to multiple data elements simultaneously.

True MIMD parallel-processing computers are rare. Many MIMD computers that are said to implement parallel processing are in fact distributed-processing computers that perform many small and near-independent processes. Other MIMD computers are redundant-processing units that are designed for fault tolerance rather than speed.

Distributed-processing computers claiming to be parallel-processing computers face problems arising from their use of a von Neumann architecture at the system level. The distributed approach is effective only as long as a computer's workload be split into different and independent processes, such as ordinary time-sharing or transaction processing.

If many interprocess communications are needed, the common global bus route to shared global memory becomes a significant constraint. With reference to FIG. 1, the global von Neumann bottleneck of distributed-processing computers is demonstrated. A global bus 10 is used to link several different processors 12 (two shown) and a global memory 14. Although each processor is accessing a shared global memory, the global memory can serve only one processor at a time. A hardware or software arbitrator must determine the priorities of the pending access requests, queue them, and serve them sequentially one request at a time. Global bus architecture causes significant delays when handling job streams with interspersed large processes that cannot be broken up. In a case such as this, the multiple processors become functionally equivalent to a single processor.

To avoid some of these problems, an MIMD computer may have multiple local processors with local memories coupled together by a interconnection network through which inputs and outputs to the processors and all the inter-processor messages are routed. Some MIMD computers may have their processors accessing both local and shared global memories, while others incorporate expensive multi-port memories to alleviate the problem of access to the memory. With whatever system is used, however, the program execution time in resolving global memory conflicts is unpredictable and may be inefficient.

SUMMARY OF THE INVENTION

In order to overcome the inefficiencies of the previously known systems, the present invention encompasses special synchronization logic circuitry and system calls that allow the configuration and orchestration of shared memory in a predictable and optimal fashion. True parallel processing is achieved by the synchronization of the processors, because no message passing, no arbitration, no contention and no latency are introduced.

A MIMD computer is disclosed herein which has a plurality of physically identical processors, one of which can function as a master processor and the others of which can function as slave processors. Each processor has its own local memory and local input/output capabilities, and therefore can act as an independent computer. Each of the processors are connected to a global bus and are connected through an interconnection switch to a shared multiaccess memory (MAM) with multiple memory modules.

The interconnection switch can be configured to provide varied access for each processor to the MAM modules. At the beginning of each phase of a program's execution, the interconnection switch is configured in a predetermined way. When each of the processors has completed its portion of that particular phase, the interconnection switch is reconfigured for the next phase, and the next phase subsequently begins. In this way, the computer makes efficient use of hardware so that n processors can solve a problem almost n times as fast as a single processor.

DESCRIPTION OF THE DRAWINGS

The invention will be more fully understood from the following detailed description, taken in conjunction with the accompanying drawings in which.

DETAILED DESCRIPTION OF THE INVENTION

With reference now to the drawings, there is shown a detailed description of the invention for parallel processing computers.

Figure 1:
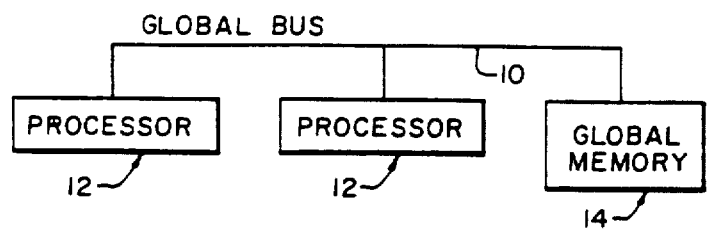
FIG. 1 is a block diagram showing the prior art use of a von Neumann architecture in a computer system.
Figure 2:
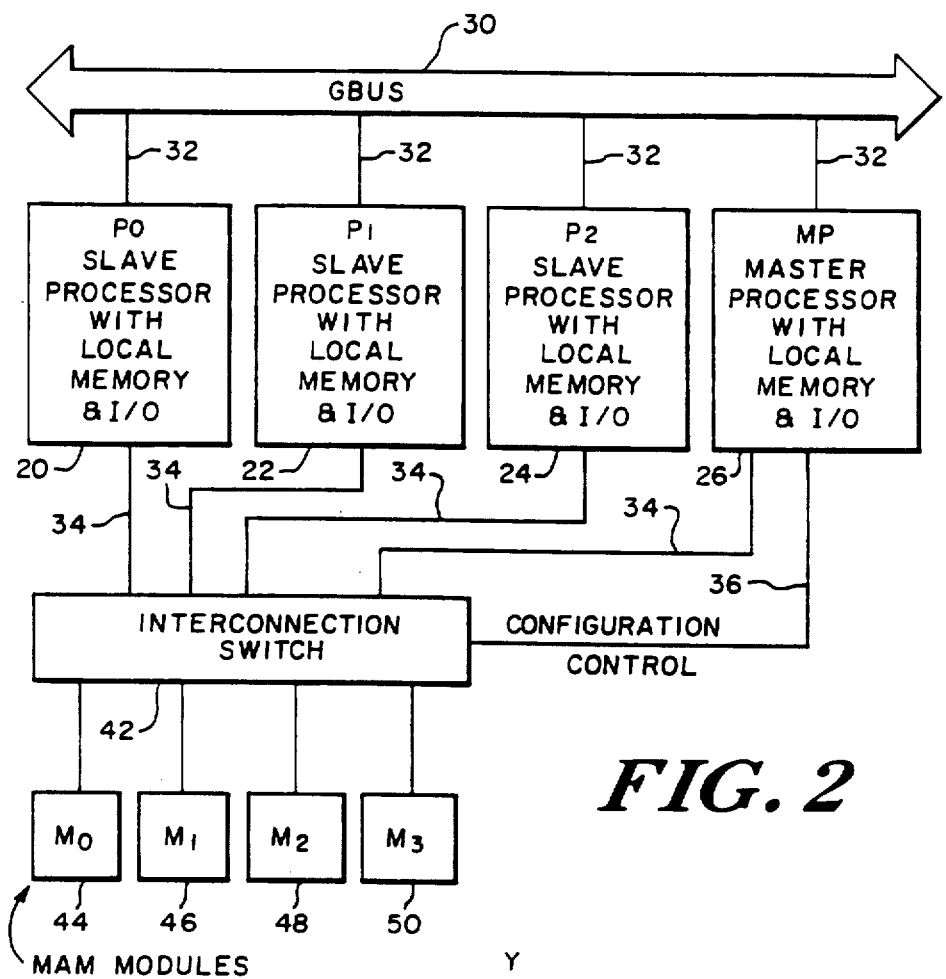
FIG. 2 is a block diagram of an MIMD computer with shared memory according to the present invention.

With reference to FIG. 2, an MIMD computer is shown which has four physically identical processors 20, 22, 24 and 26. Processor 26 is the master processor MP, while processors 20, 22 and 24 function as slave processors $P_0$, $P_1$ and $P_2$. Each of the four processors has its own local memory and local input/output capabilities, and each therefore could act as an independent computer. It will be appreciated that while, for purposes of explanation, four processors are discussed herein, any reasonable number of processors would work equally as well.

The master-slave relationship between the processors is a soft one, in that any one of the processors could be programmed dynamically to be the master, and the other processors the slaves. In those applications where the master's work is minimal, such as in a single user environment, it is also possible to save a processor by imbedding the control function of the logical master into the function of a logical slave so that a physically separate processor is not required to act exclusively as the master.

The four processors 20, 22, 24 and 26 are connected to a global bus (GBUS) 30 by data lines 32. The global bus 30 carries global data paths, their controls, and global synchronization signals.

The slave processors 20, 22 and 24 are connected by data lines 34 to an interconnection switch 42, which is in turn connected to a shared multi-access memory (MAM) with, in this example, four memory modules 44, 46, 48 and 50. The multi-access memory should have as many individually addressable modules $M_n$ as there are processors, and these are shown in FIG. 2 as $M_0$, $M_1$, $M_2$ and $M_3$.

Figure 8:
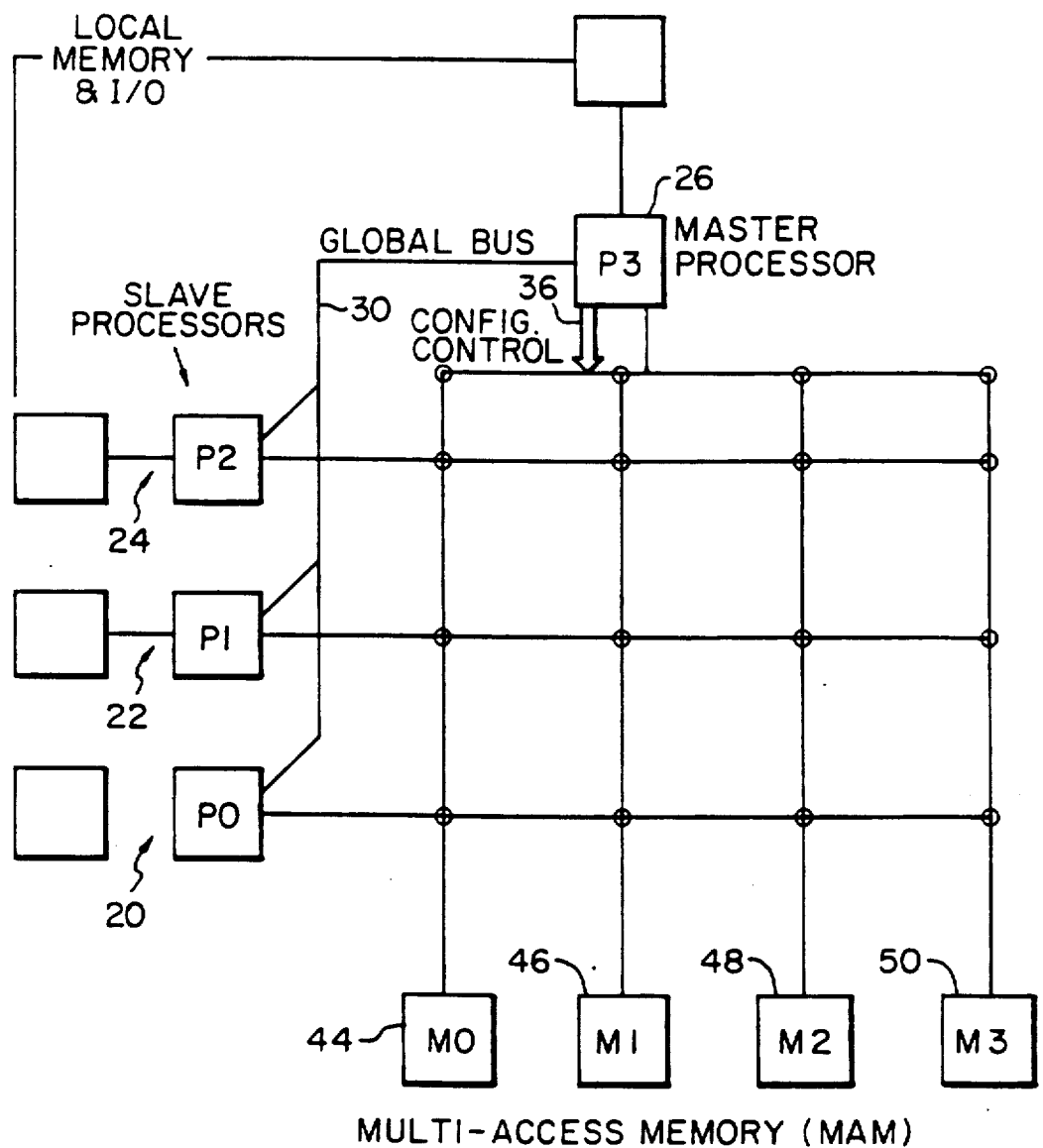
FIG. 8 is a block diagram schematic showing an interconnection switch for use in the present invention.

The interconnection switch 42, shown in more detail in FIG. 8, is configured by a signal from the master processor 26 sent along data line 36. The interconnection switch 42 can be configured so that any one processor is connected to any number of MAM modules. Each MAM module, however, can only be connected to one processor at one time.

Because applications may require the use of various interconnection configurations, typically one program uses several configurations during the course of a parallel run. For example, if a one-to-one switch connection configuration is desired, all processors can access the shared memory simultaneously without arbitration. If it is desired to have one processor connect to several MAM modules, however, then a piece of data can be written to each of these modules simultaneously with a single program instruction. In addition, a processor can write to both its local memory and the connected MAM module simultaneously with a single instruction.

Figure 9:
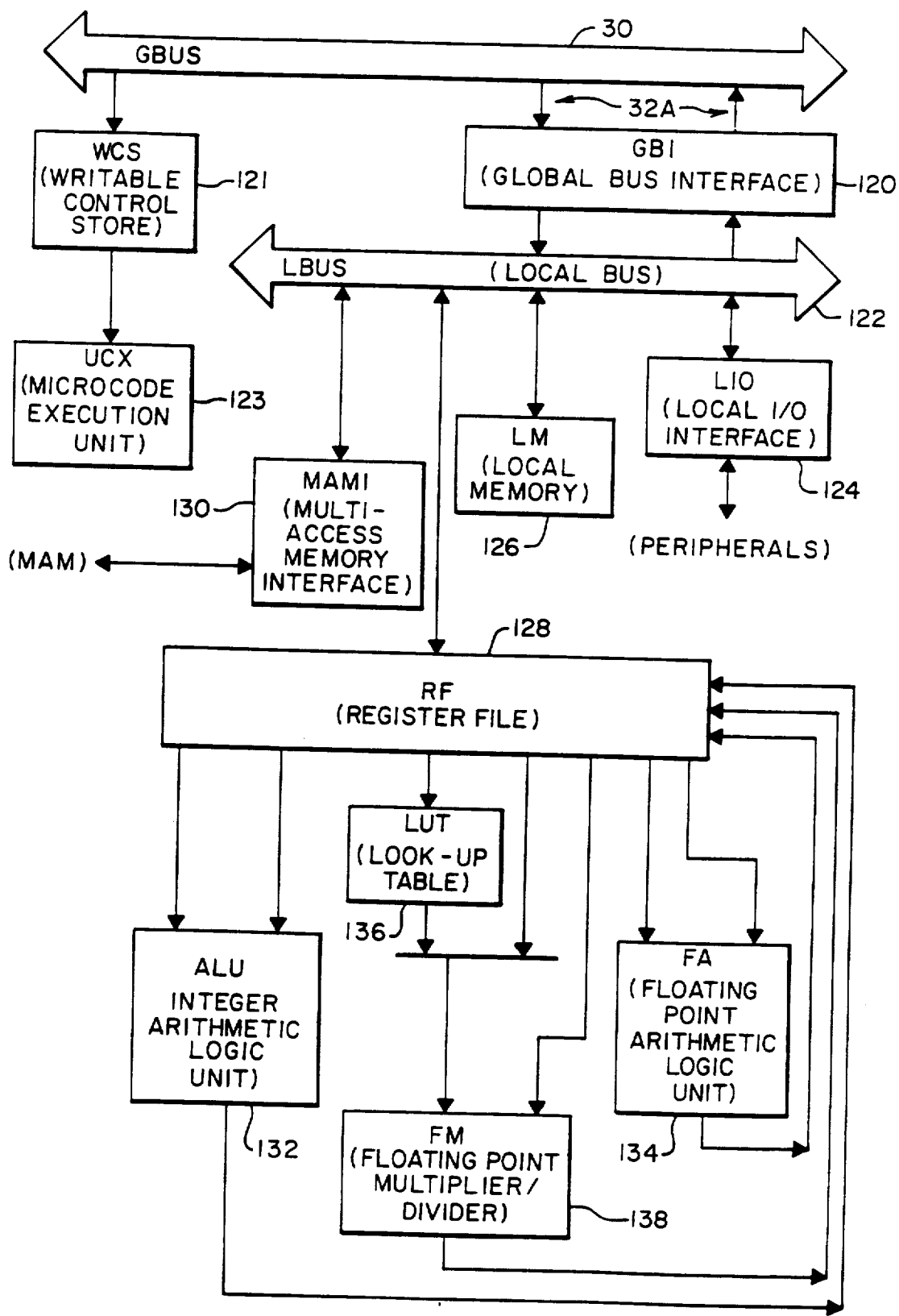
FIG. 9 is a block diagram of an individual processor as used in the present invention.

FIG. 9 provides a more detailed block diagram showing the various components of the MIMD computer with respect to a single processor, for example $P_0$. The GBUS 30 connects by means of input and output data lines 32A with a global bus interface (GBI) 120, which connects the GBUS 30 with a local bus (LBUS) 122. The GBUS 30 also serves the writable control store 121 and through it the microcode execution unit 123.

The LBUS 122 serves a local input/output interface 124 to peripherals such as disk drives, tape drives, CRT displays, printers or timers. The LBUS 122 also serves the local memory 126 to the particular processor, the multi-access memory interface 130 to the interconnection switch and MAM modules, and the register file 128 which can address the integer and floating point arithmetic logic units 132 and 134, respectively, a look-up table 136 and a floating point multiplier/divider 138.

Figure 3:
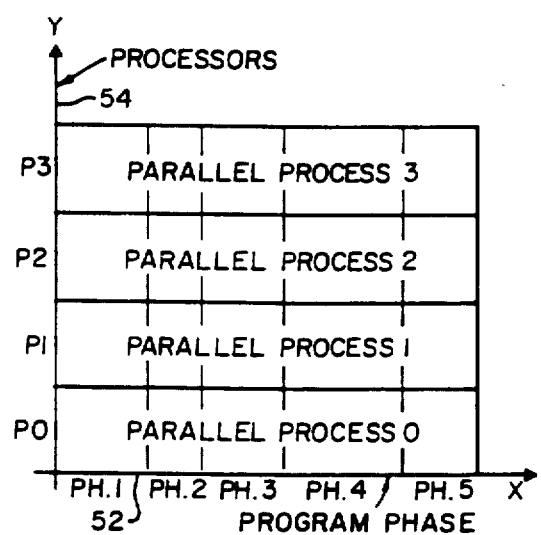
FIG. 3 is a graphic representation of the partitioning of a single program for purposes of the present invention.
Figure 4:
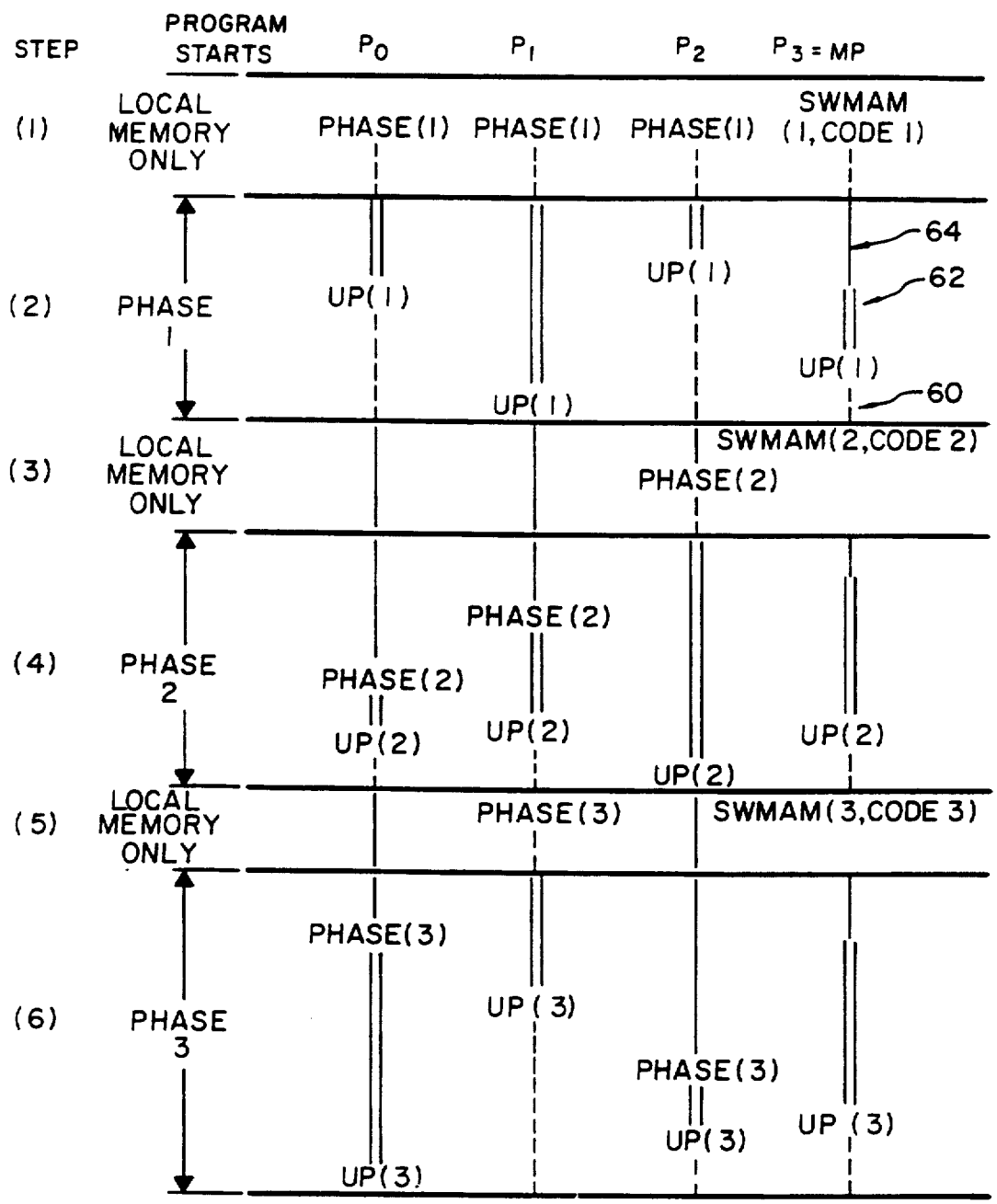
FIG. 4 is a graphic representation of the synchronization of parallel program execution according to the present invention.
Figure 5:
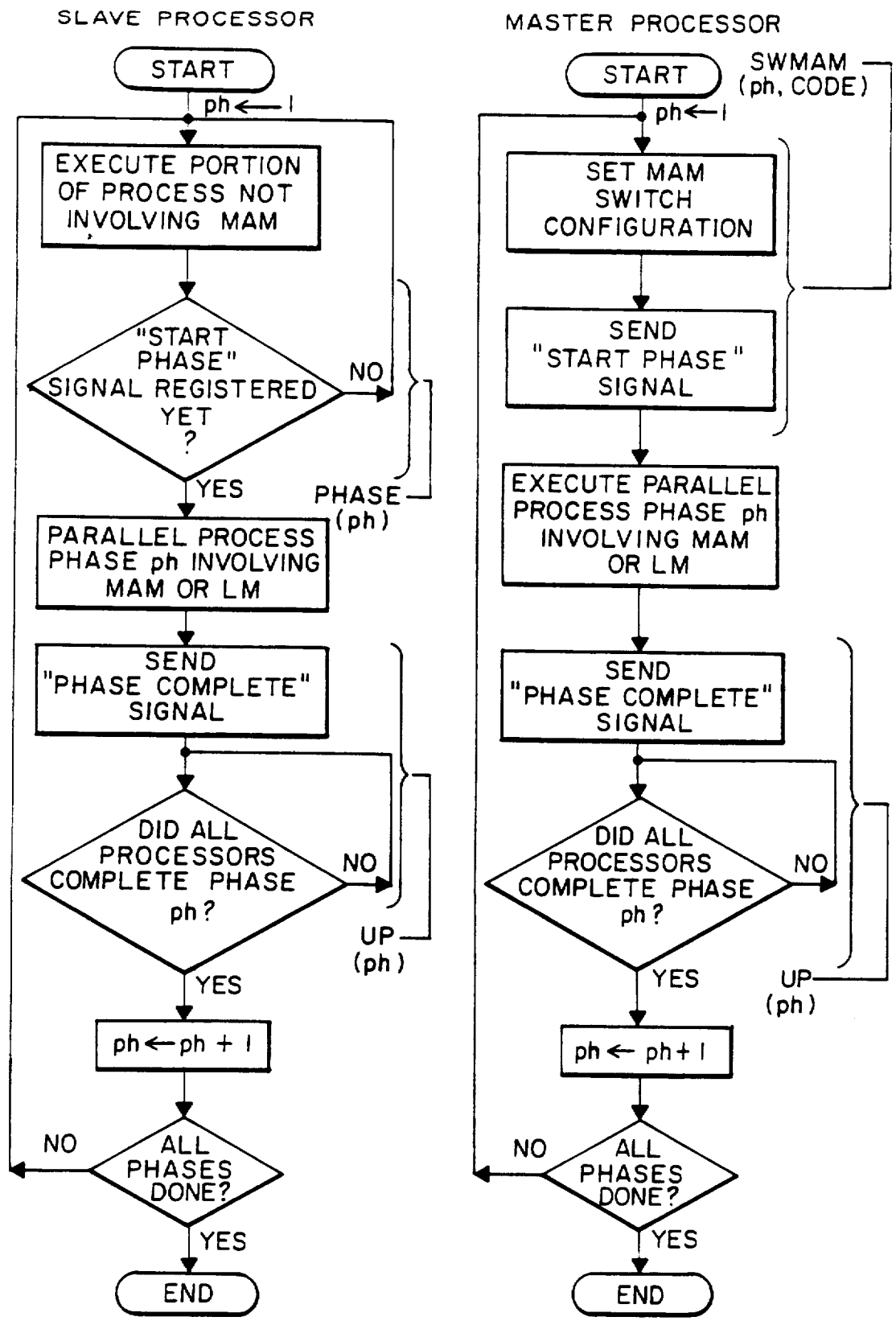
FIG. 5 is a flowchart depicting the steps occurring in the master and slave processors during operation of the present invention.

With reference to FIGS. 3, 4 and 5, the computer synchronization method of the present invention can be more fully understood. FIG. 3 shows the partitioning of a sample program to run under the strategy of the present MIMD computer. The program is divided, for purposes of example, into five phases, or stages of execution. Each stage requires a different MAM module switch configuration.

In FIG. 3, the x-axis 52 represents the time dimension, and shows that the program is decomposed into phases, of which five are shown here. The y-axis 54 represents the space dimension, and shows that the program is run by four processors $P_0$ through $P_3$. FIG. 3 therefore graphically shows the operation of four processors running four processes in parallel through five phases, or stages, of execution.

FIG. 4 graphically provides an example of a synchronization scheme for a sample parallel program execution, and shows the timing relationships between the various phases and processors. In FIG. 4, a single broken line, such as 60, represents time during which a processor is waiting for other processors. A double line, such as 62, represents time during which shared memory instructions are operating. A single solid line, such as 64, represents time during which the processor's operations are completely local to the processor.

At the beginning of operation, at step 1 of FIG. 4, each of the four processors are at the same stage of preparedness, waiting for the signal which will initiate phase 1. During this time, the interconnection switch 42 of FIG. 2 is configured in a predetermined way by the master processor by means of a "SWMAM(ph, code)" system call, where "ph" represents the serial phase number ("ph"=1 is the first phase), "code" represents a specific switch configuration code, and SWMAM stands for "Switch MAM." Each unique configuration of the interconnection switch allowed by the hardware design is assigned a unique code for programming purposes.

At step 1, the SWMAM(1, code$_1$) call will change the MAM interconnection switch 42 to a new configuration, identified by "code$_1$". After the interconnection switch is ready for the first phase, the GBUS provides slaves $P_0$, $P_1$ and $P_2$ with signals representing "start phase." The slave processors test for this readiness by means of a "PHASE(1)" system call which is the slave's own "start phase."

As shown in step 2 of FIG. 4, when the master processor sends out the first signal, each of the processors begin their phase 1 operations. When a processor completes a processing phase using the MAM modules, the processor, whether master or slave, executes an "UP(ph)" system call, which sends out the "phase complete" signal for that processor on the GBUS. A "system call" is a subroutine called by a user program to ask the operating system to do some system function. "UP(ph)" is a call to tell the operating system that that particular phase has been completed. Each of the processors will wait for all the others to have executed their "UP(ph)" system call. This synchronization is necessary not only because of the MAM switching, but also because debugging would be strenuous if the parallel processors cannot be in completely known states at certain specific points in time.

At the end of step 2, when each of the processors have sent out their "UP(1)" signal indicating the completion of phase 1 within that processor, the master processor reconfigures the interconnecting switch using the SWMAM(2, code$_2$) call. When reconfiguration is complete, a signal is sent allowing each of the processors to begin phase 2, with their shared use of the MAM modules.

It can be noted that even though a slave's "PHASE(ph)" system call waits for the master's configuring of the interconnection switch, the slave's system calls do not have to wait for each other. The GBUS "start phase" signal gets registered (i.e., remembered by the logic circuitry) by each slave processor as soon as the master sends out the first system call. This allows for overlapping of the portions of the process that do not use the MAM modules between phases. This is seen in FIG. 4, step 3, where processors $P_1$, $P_2$ and $P_3$ have begun local calculation before they have access to the shared MAM modules. Thus, while the slave processors are awaiting the signal allowing them to share the MAM modules, they need not sit idle, but when shared memory is necessary, the processor must wait.

In FIG. 4, after all the processors have completed phase 2, the switch is again reconfigured and processing continues. While FIG. 4 shows only three phases, there is, in practice, no such limit.

To balance the workloads of the different processors in each phase, algorithms can be chosen either manually by the programmer or automatically by a parallelizing compiler. An algorithm can, for example, be predivided and assigned to a pre-stored subroutine. Balancing allows for higher efficiency of utilization of the machine, with n processors in a well-balanced program delivering close to n times the performance of one processor.

FIG. 5 is a flowchart showing the processes occurring in the master and slave processors during the phase synchronization scheme depicted in FIG. 4. In the master processor, during the SWMAM(ph, code) system call, the MAM switch is set and the GBUS "start phase" signal is sent and registered in each slave processor. During this time, the slave processor is executing that portion of its process not involving the MAM. When the "start phase" signal is sent by the master and received by the slave processors, the parallel process phase is begun by all the processors, and can involve both the MAM modules and the local memory.

When a processor completes its phase, it sends out a "phase complete" signal, and enters its "UP(ph)" system call. When all the processors complete their phase, the phase counter is incremented by one and, if there are more phases to run, the interconnection switch is reconfigured and the next phase executed, until there are no further phases to run. It should be noted that the GBUS "phase complete" signal becomes detectable by the other processors only when all processors have sent the "phase complete" signal.

Figure 6:
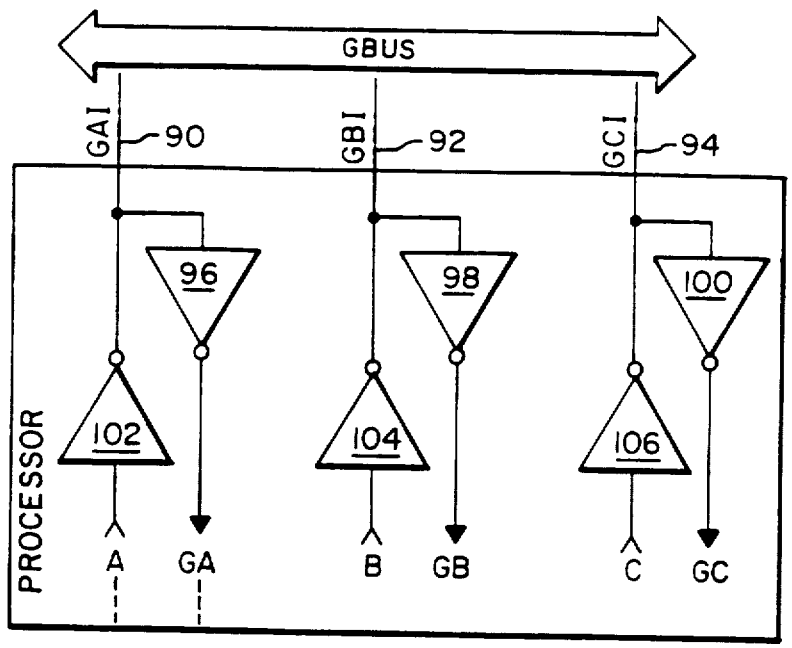
FIG. 6 is a logic diagram showing interface circuitry for a global bus synchronization signal.

With reference to FIG. 6, there is shown interface circuitry for the GBUS synchronization signals behind the system call timing mechanisms. Each individual processor's driving signals, A, B and C, are inverted by inverters 102, 104 and 106, respectively, and then enter the GBUS as signals GAI, GBI and GCI. The signals GAI, GBI and GCI are bi-directionally connected on data lines 90, 92 and 94, respectively, to each of the processors (one shown) through the GBUS, so that the signals are jointly generated and sensed by each of the master and slave processors. (The "G" stands for "global." The "I" stands for "inverted," because a low signal is active, and a high signal is inactive). Because of the inverted nature of the GAI, GBI and GCI signals, received signals GA, GB and GC must pass through inverters 96, 98 and 100, respectively, The GAI, GBI and GCI signals work sequentially in rotation. Each processor drives each signal with an "open collector" or "open drain" circuit such that if any one processor activates its driving signal, the aggregate GBUS signal becomes active.

Figure 7:
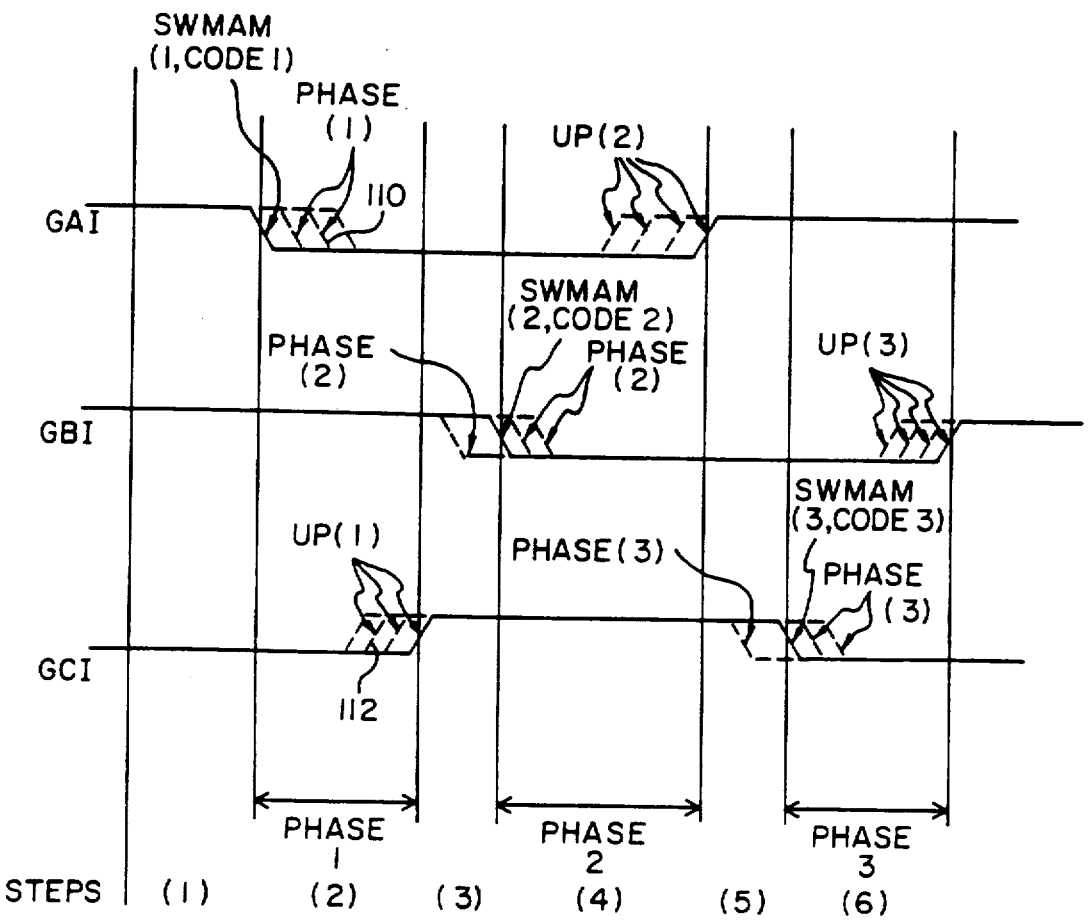
FIG. 7 is a timing diagram of the global bus synchronization signals.

FIG. 7 is a timing diagram of the GBUS synchronization signals GAI, GBI and GCI. In FIG. 7, the solid lines represent the states of the GAI, GBI and GCI signals. Initially, during step 1, the GAI and GBI signals are inactive, as shown by high signals, and the GCI signal is active, as shown by the low signal. At the beginning of phase 1, the global GAI goes active, or low, when one processor, normally the master processor, activates its local A signal by means of the "SWMAM(1, code$_1$)" system call. All of the processors will sense this composite "start phase" signal, which in FIG. 7 is GAI active, GBI inactive and GCI active, and will register this change automatically without affecting the program execution.

If any processor, whether the master or any slave processor, then provides a "PHASE(1)" signal, as represented by the dotted line 110, this registered change in the GAI signal will be sensed, the processor's own A signal will be activated, and its process execution will continue. If a processor does its "PHASE(1)" before this "SWMAM(1, code$_1$)" signal is sent by the master processor, however, then no further instructions will be executed in the particular slave processor until the next "start phase" signal is received, at which point the slave processor's local signal A will be activated.

When a processor finishes using the MAM configuration of phase one, it provides an "UP(1)" signal which deactivates its C signal, as shown at dashed line 112, and tests for the deactivization of GCI before continuing. Since the global GCI signal remains active if any local C signal is active, only when the last processor deactivates its C signal will GCI itself become deactivated. This will be sensed by each processor's "UP(1)," which will then return to the main process and execution will continue. It should be noted that with this system, one processor can finish phase one before another processor starts its own MAM module access for phase 1.

After phase one has been completed by all processors, phase two similarly may be started, as shown in period 3 of FIG. 7, by a "SWMAM(2, code$_2$)," which, in FIG. 7, keeps GAI active and GCI inactive, and activates GBI. The "PHASE(2)" calls will follow the signals locally, and as the "UP(2)" calls deactivate the local A signals, the global GAI will become deactivated at the end of phase 2. Similarly, phase 3 commences when one processor activates a local C signal, driving GCI active, and finishes when all processors deactivate the B signal, driving GBI inactive. After phase 3, the three signals are returned to their original states, as they were before phase 1, and the pattern will repeat itself every three phases until the entire program is complete or until the computer is reset. Finally, it should be noted that digital filtering of the signals may be done by each processor so that inadvertent electronic noise on the GBUS signals will not affect the proper functioning of the synchronization.

Figure 10A:
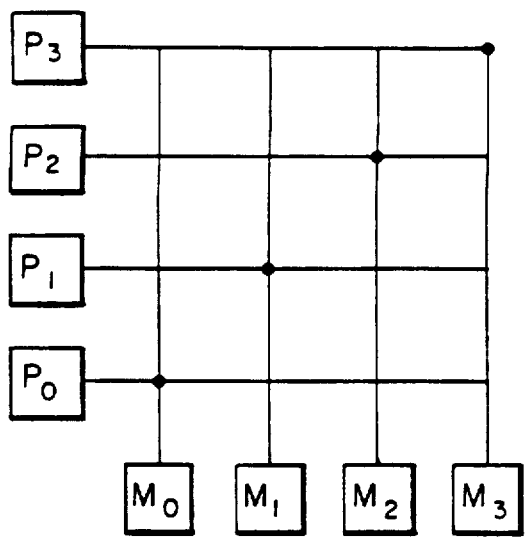
FIG. 10A-10C are block diagram schematics providing examples of various interconnection switch configurations as used in the present invention.
Figure 10B:
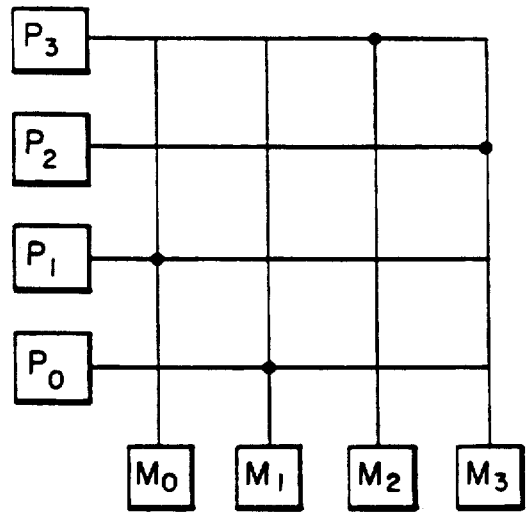
Figure 10C:
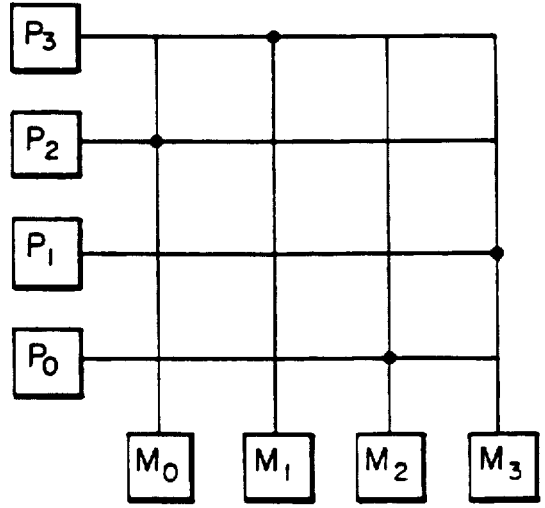

An example can be provided to allow for a better understanding of the processes explained herein, with reference to FIGS. 10A–10C, which show various configurations of the interconnection switch. Take, for example, the requirement to sum the products of 1000 pairs of numbers:

$$S = \sum_{i=0}^{999} (x_{[i]} * y_{[i]}).$$

The program, written in the C-language format, would appear as follows:

| Slave Processors $P_p(p=0, 1, 2)$ | Master Processor $P_3$ |
|---|---|
| PHASE(1); | SWMAM(1, code$_1$); |
| S=0; | S=0; |
| For (i=p*250; i<(p+1)*250;i++) | For (i=750; i<1000; i++) |
| $S = S + x[i]*y[i]$; | $S = S + x[i]*y[i]$; |
| UP(1); | UP(1); |
| PHASE(2); | SWMAM(2, code$_2$); |
| $S = S + \backslash S$; | $S = S + \backslash S$; |
| UP(2); | UP(2); |
| PHASE(3); | SWMAM(3, code$_3$); |
| $S = S + \backslash S$; | $S = S + \backslash S$; |
| UP(3). | UP(3). |

With reference to this example program, during PHASE(1), the master processor issues its SWMAM(1, code$_1$) call, which configures the interconnection switch as shown in FIG. 10A. Each processor is then connected to one MAM module, with processor $P_0$ connected to MAM $M_0$, and so on. After the switch is configured for PHASE(1), each processor, including the master processor $P_3$, sums the products of 250 pairs of numbers. When each processor completes this portion of its assignment, it issues its UP(1) call. (The "$S" in the above program indicates the sums are written into both local memory and the MAM. "S" indicates local memory only and "\S" indicates MAM only).

The master processor $P_3$ then reconfigures the interconnection switch by the SWMAM(2code$_2$) call, which provides a switch as shown in FIG. 10B. Now, processor $P_1$ has access to MAM $M_0$, and so on as shown. In PHASE(2), the processors add the sums of two sets of 250 numbers from the previous phase. ('S refers to the sum in the MAM only). Thus, in PHASE(2), each processor adds the sum in its local memory (S) to the sum created by a different processor in the previous phase, and placed into the MAM ('S).

Finally, in PHASE(3), the switch is again configured, as shown in FIG. 10C, to permit the combination of all the partial sums to arrive at the final total. It will be seen that with this process, 1000 numbers are added in roughly one-quarter the time as if done by a single processor.

As is apparent from the present description, other modifications and alternative implementations will occur to those versed in the art without departing from the true spirit and scope of the invention. Accordingly, it is not intended to limit the invention to what has been particularly shown and described except as indicated in the appended claims.

What is claimed is:

1. An apparatus for parallel data processing over a plurality of phases, comprising:

a plurality of processors, any one of said processors operative as a master processor, said master processor including means for generating interconnection switch configuration control signals;

a communication bus for interconnecting each of said processors, for exchange of at least control and synchronization information among each of said processors;

a plurality of multi-access memory modules;

an interconnection switch coupled to each of said processors and each of said multi-access memory modules, and responsive to said interconnection switch control signals from said master processor, for selectively interconnecting any one or more of said processors with one or more of said multi-access memory modules, and whereby any one of said multi-access memory modules is exclusively interconnected to only one of said processors during any given phase of processing;

each of said processors further including local memory, whereby one or more of said processors processes data in its local memory before, after, and during a phase of processing;

said master processor further including means for generating a processing phase commencement signal over said communication bus to the other of said processors, said commencement signal indicating the start of each of said plurality of phases of parallel data processing during which any one or more of said plurality of processors is exclusively interconnected to said one or more multi-access memory modules; and each of said processors further including means for generating a completion signal over said communication bus to the other of said processors said completion signal indicating completion of each phase of processing.

2. The apparatus of claim 1 wherein the number of processors is equal to the number of multi-access memory modules.

3. The apparatus of claim 1 wherein said interconnection switch connects each of said processors with a different one of said multi-access memory modules.

4. The apparatus of claim 1 wherein said interconnection switch interconnects any one of said processors with more than one of said multi-access memory modules.

5. The apparatus of claim 1 wherein each of said selectively interconnected processors writes data to its local memory and to one or more selectively interconnected multi-access memory modules.

6. A method for multiple instruction stream-multiple data stream (MIMD) parallel data processing in a computer including a plurality of processors operating in synchronism over a plurality of phases, each of said processors including local memory, and wherein any one of said processors is operative as a master processor, said plurality of processors being interconnected by a communication bus for conveyance of at least control and synchronization information among each of the processors, said computer further including a plurality of multi-access memory modules, and an interconnection switch coupled to each of said plurality of processors and each of said plurality of multi-access memory modules, said interconnection switch responsive to control signals from said master processor, said method comprising the steps of:

issuing a first set of configuration control signals from said master processor to said interconnection switch, for establishing a first switch configuration for selectively interconnecting any one or more of said processors with any one or more of said multi-access memory modules, and whereby any one of said multi-access memory modules is connected to only one of said processors during any given phase of processing;

executing a first phase of processing by each of said processors, including processing data stored in the respective local memory of one or more of said processors and processing data stored in said one or more of multi-access memory modules selectively interconnected with any one or more of said processors;

generating a completion signal from each of said processors over said communication bus to the other of said processors, said completion signal indicating completion of a phase of processing;

issuing a subsequent set of configuration control signals from said master processor to said interconnection switch upon receipt of a completion signal from each one of said plurality of processors, for providing a subsequent configuration of said interconnection switch for selectively interconnecting any one or more of said processors to any one or more of said multi-access memory modules;

executing a subsequent phase of processing by each of said processors, including processing data stored in the respective local memory of any one or more of said processors and processing data stored in one or more selectively interconnected multi-access memory modules; and returning to the step of generating a completion signal from each of said processors indicating completion of said subsequent phase of processing by each of said processors.

7. The method of claim 6 further including prior to the steps of executing a first or subsequent phase of processing, the step of processing data by one or more of said processors utilizing data stored in the respective local memory of said one or more processors.

8. The method of claim 6 further including prior to the steps of executing said first or subsequent phase of processing, the step of sending a phase commencement signal from the master processor over said communication bus to the other of said processors, said commencement signal indicating the beginning of said first or subsequent phase of processing.

* * * * *

UNITED STATES PATENT AND TRADEMARK OFFICE
CERTIFICATE OF CORRECTION

PATENT NO. : 5,056,000
DATED : October 8, 1991
INVENTOR(S) : Robin Chang

It is certified that error appears in the above-identified patent and that said Letters Patent is hereby corrected as shown below:

Column 1, line 37, "workload be split" should read --workload can be split--.

Column 1, line 59, "by a interconnection" should read --by an interconnection--.

Column 7, line 19, both occurrences of "$S=S+ S;" should read --$S=S+ \S;--.

Column 7, line 21, both occurrences of "$S=S+ S;" should read --$S=S+ \S;--.

Column 7, line 38, "by the SWMAM(2code$_2$) call," should read --by the SWMAM(2, code$_2$) call,--.

Signed and Sealed this

Twentieth Day of July, 1993

*Attest:*

*Attesting Officer*

MICHAEL K. KIRK

*Acting Commissioner of Patents and Trademarks*